United States Patent
Jones et al.

(10) Patent No.: US 9,546,746 B2
(45) Date of Patent: Jan. 17, 2017

(54) TUBULAR SUPPORT STRUCTURE WITH VARIABLE WALL THICKNESS

(71) Applicant: L & W Engineering, Belleville, MI (US)

(72) Inventors: Scott Jones, Belleville, MI (US); Joshua Forquer, Beverly Hills, MI (US)

(73) Assignee: L & W ENGINEERING, Belleville, MI (US)

( * ) Notice: Subject to any disclaimer, the term of this patent is extended or adjusted under 35 U.S.C. 154(b) by 206 days.

(21) Appl. No.: 14/148,418

(22) Filed: Jan. 6, 2014

(65) Prior Publication Data

US 2014/0190586 A1    Jul. 10, 2014

Related U.S. Application Data

(60) Provisional application No. 61/749,683, filed on Jan. 7, 2013.

(51) Int. Cl.
| | |
|---|---|
| *B21C 1/24* | (2006.01) |
| *B21C 37/15* | (2006.01) |
| *F16L 9/02* | (2006.01) |
| *B21C 3/16* | (2006.01) |

(52) U.S. Cl.
CPC . *F16L 9/02* (2013.01); *B21C 1/24* (2013.01); *B21C 3/16* (2013.01); *B21C 37/156* (2013.01)

(58) Field of Classification Search
CPC ............... B21C 1/16; B21C 1/18; B21C 1/22; B21C 1/24; B21C 1/26; B21C 25/08; B21C 37/156; B21C 3/16
See application file for complete search history.

(56) References Cited

U.S. PATENT DOCUMENTS 5,989,133 A * 11/1999 Lee .................. A63B 53/12
473/323

FOREIGN PATENT DOCUMENTS

FR            783649 A  *  7/1935  ............... B21C 1/26

* cited by examiner

*Primary Examiner* — Debra Sullivan
(74) *Attorney, Agent, or Firm* — Fishman Stewart PLLC

(57) ABSTRACT

A support structure may include a metallic tube having two opposing ends. The first end may have a first length, a first wall thickness, and a first outer diameter. The second end may have a second length, a second wall thickness, and a second outer diameter. A transition area may be disposed between the first length and the second length. The first wall thickness may be greater than the second wall thickness thereby providing variable thickness.

20 Claims, 3 Drawing Sheets

TUBULAR SUPPORT STRUCTURE WITH VARIABLE WALL THICKNESS

CROSS-REFERENCE TO RELATED APPLICATIONS

This application claims benefit of U.S. Provisional Application 61/749,683 filed on Jan. 7, 2013, the contents of which are incorporated herein in their entirety.

FIELD OF TECHNOLOGY

The present disclosure relates generally to a tubular support structure, and more particularly to a tubular support structure with variable wall thickness.

BACKGROUND

Structural supports, such as steel pipes, are hollow tubes that are used for a variety of applications, including vehicle frames and chassis, heating and plumbing systems, flagpoles, building frames and infrastructure, to name a few. Structural supports may be produced by two distinct processes that may result in either a seamless or welded support. Raw metal, such as steel, is first cast into a workable starting form, and then is made into a support (e.g., a pipe) by stretching the steel out into a seamless tube or forcing the edges together and sealing them with a weld. The result is a structural support with uniform diameter and wall thickness.

However, modern production processes for metal supports typically results in sacrificing mass savings for support strength, or vice versa.

Overcoming these concerns would be desirable and could save the industry substantial resources.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

A product and method of making a structural support product to support components within a steel structure is disclosed. More particularly, a product and method for its production relate to differing wall thicknesses without requiring mechanical or metal joining methods. In essence, the structural support may include at least a first portion having a first wall thickness and a second portion having a second wall thickness, where the first wall thickness is greater than the second wall thickness. The process used to produce this product has advantages with respect to mass and strength of the material on the second less thick portion.

Figure 1:
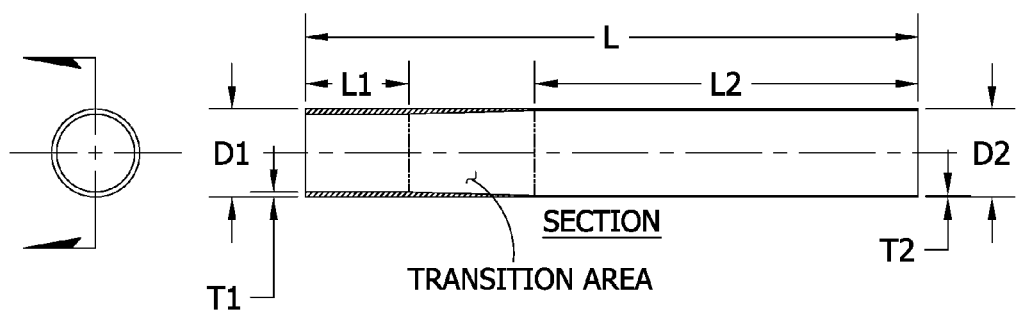
FIG. 1 illustrates an exemplary tubular support structure with variable wall thickness.

FIG. 1 discloses an exemplary integral hollow tubular support structure of varying length comprised of two sections and a transition area disposed therebetween. (e.g., L1, transition area, and L2). Although two sections L1 and L2 and a transition area are illustrated, the same principles apply to a tubular support having indefinitely variable wall thickness, e.g., a plurality of varying wall thicknesses as will be discussed below.

According to one implementation, the support is formed from a single piece of tubing (e.g., seamless or welded). The support may be comprised of many materials, including but not limited to ceramics, fiberglass, and metals such as steel, iron, black (lacquer) steel, stainless steel, carbon steel, galvanized steel, brass, aluminum, and copper to name a few. As depicted, the support may include lengths L1 and L2 which may be of varying length while the size of the transition area may also vary depending on corresponding wall thicknesses T1 and T2 and the corresponding lengths of L1 and L2. For example, the transition area may become larger as the difference between T2 and T1 increases. In one approach, the wall thickness may vary generally consistently over the length of the transition area. That is, the transition area may include a gradual gradient to transition from the wall thickness of T1 to the wall thickness of T2. Thus, the transition area is generally triangular in cross section.

The lengths of L1 and L2 may vary depending on the particular application of the support and the desired material properties of the support, for instance, malleability, rigidity, and/or weight of the support. Accordingly, it is not necessary for length L1 to be less than length L2 as illustrated in FIG. 1, but rather lengths L1 and L2 may vary depending on the particular application in which the support will be used. For instance, the length of L1, with a wall thickness T1 greater than T2, may be increased (and consequently decrease the length of L2) for a support used in connection with an automobile frame as compared to a support used in a bicycle frame.

In one exemplary approach, the diameter of D1 essentially corresponds to the diameter of D2 subject to tolerance considerations. Diameters D1 and D2 may generally reflect the outer diameter of the tubular support, and D1 may generally equal D2 subject to tolerances. Accordingly, a substantially uniform diameter along the length L of the tubular support may allow the supports to be easily fitted with joints such that two or more pieces may be connected. While diameters D1 and D2 may generally match one another, the thickness of T1 is always greater than T2. In other words, the inner diameter of T1 is less than the inner diameter of T2. As illustrated in FIG. 1, the wall thicknesses T1 and T2 are generally constant along the respective lengths L1 and L2, respectively. The resulting support demonstrates superior strength and resistance to stresses, while at the same time reducing overall mass and consequently saving on cost of materials.

According to another implementation, the tubular support structure may comprise multiple or indefinitely variable wall thickness. That is, the support have multiple lengths L1, L2, L3, L4, etc., each length comprising a different wall thickness T1, T2, T3, T4, etc. with transition areas disposed therebetween. For instance, T1 may have a greater wall thickness than T2 which may have a greater wall thickness than T3, so on and so forth. Additionally or alternatively, thicknesses T1 and T3 may be substantially equal, whereas the thickness of T2 disposed therebetween may be less than T1 and T3. The size or length of the transition area may be a function of the difference in wall thicknesses adjacent to the transition area. For example, the transition area may become smaller as the difference in wall thickness between T2 and T3 decreases. Accordingly, the transition area disposed between T1 and T2 may have a higher gradient than the transition area between T2 and T3.

Figure 2A:
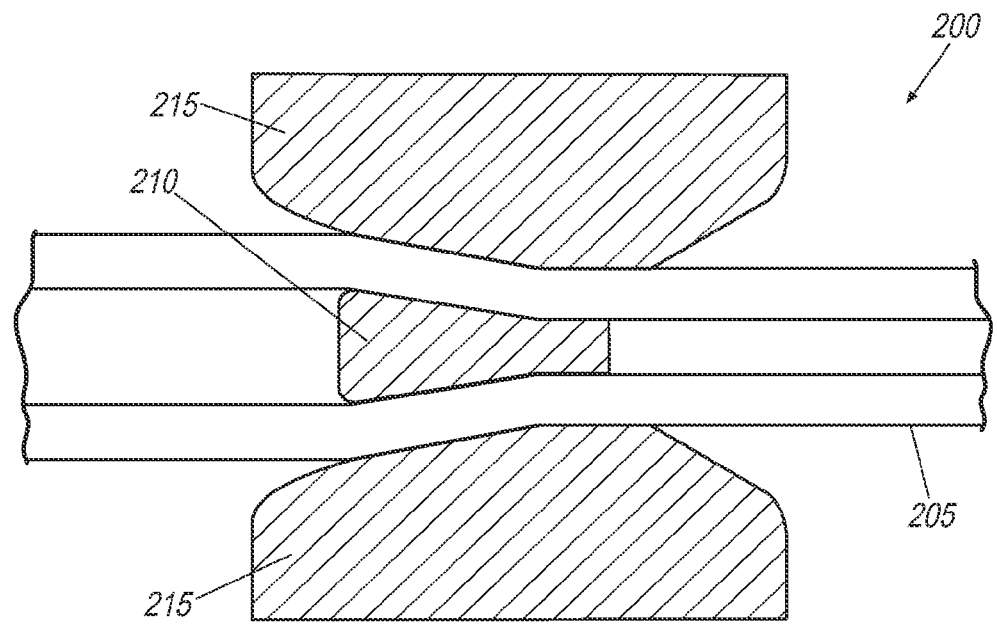
FIG. 2A illustrates an exemplary tube forming apparatus having an inner tool and an outer tool.
Figure 2B:
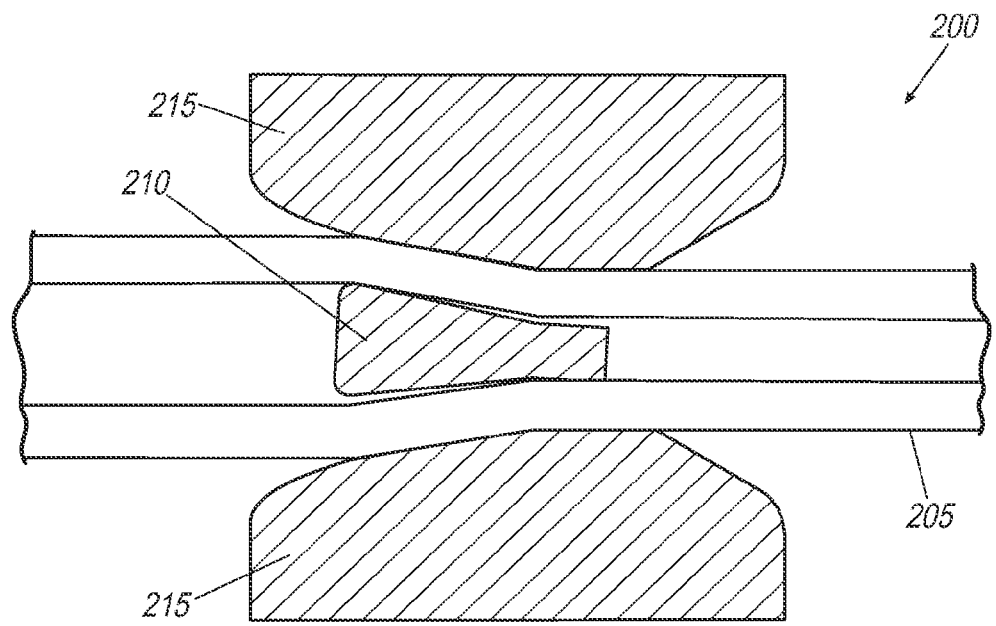
FIG. 2B illustrates the exemplary tube forming apparatus according to FIG. 2A with the inner tool manipulated to vary the tubular support wall thickness.

FIGS. 2A and 2B illustrate an exemplary tube forming apparatus 200 used to form a tubular support structure 205 having variable wall thickness. The apparatus 200 may include an inner tool 210 arranged concentrically within the support 205 and at least one outer tool 215 disposed about the perimeter of the support 205. The inner tool 210 may include, for example, a mandrel configured to form the inner diameter of the support 205. The outer tool 215 may comprise rollers, disks, and/or die used to set the outer diameter of the support 205. The diameter of the inner tool 210 may represent the first wall thickness of the support 205. That is, the diameter of the inner tool 210 may represent the thickest wall section of the support 205. The inner tool 210 may then be manipulated in relation to the outer tool 215 to form varying wall thickness and the transition area.

FIG. 2B illustrates the inner tool 210 manipulated in relation to the outer tool 215 to form a second wall thickness varying from the first wall thickness. The inner tool 210 may be wedged or otherwise manipulated to change the relationship of the inner tool 210 with respect to the outer tool 215. This change in relationship between the inner tool 210 and the outer tool 215 may form varying wall thicknesses along the length of the support 205, as described in more detail below.

Figure 3:
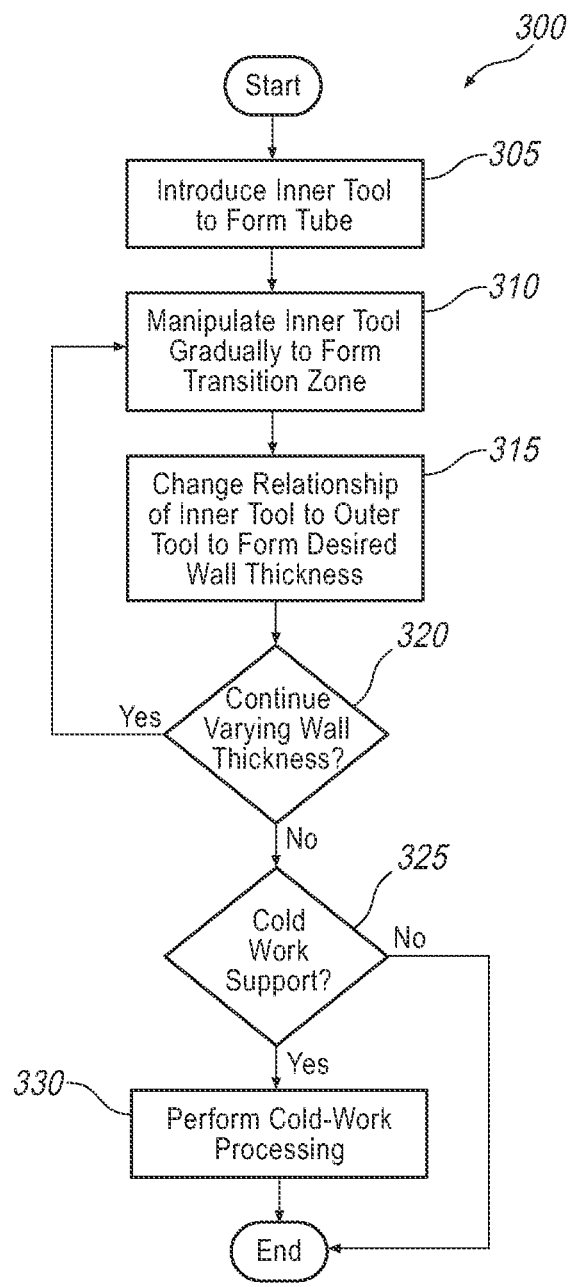
FIG. 3 illustrates an exemplary process for producing a tubular support with variable wall thickness.

FIG. 3 illustrates an exemplary process 300 for forming a tubular support structure with variable wall thickness. The process 300 may involve hot-working a material, such as metal, from an ingot, slab, boules, or billet, for example. The process 300 may include an outer tool (e.g., an arrangement of rollers, disks, die, etc.) and an inner tool, such as an inner diameter (ID) piercing mandrel. The ingot, boules, slab, or billet may be fed into the outer tool to stretch the metallic material and the ID piercing mandrel may be inserted concentrically. In essence, the ID piercing mandrel is manipulated within the tubular support to produce variable wall thickness. The diameter of the ID piercing mandrel represents the thickest section of the support as the mandrel size is constant and thus T1 may epitomize the outer diameter of the piercing mandrel. The mandrel may then be manipulated in relation to the outer tool to form varying wall thicknesses $T_x$ and $T_y$ for lengths $L_x$ and $L_y$. The process 300 may proceed to shaping the variable wall thickness of the tubular support.

At block 305, the ID piercing mandrel may be worked inside the billet/ingot, which is fed through the outer tool, to form a tubular support. The dimension of the outer tool may comprise the outer diameter of the support such that the diameter is substantially uniform along the length of the support L, subject to tolerances. The outer diameter of the piercing mandrel may represent a first wall thickness T1 and may be worked uniformly for a length L1. Alternatively, wall thickness T1 may represent the first stage of manipulating the inner tool in relation to the outer tool, as discussed below. Upon reaching the desired length L1, the process 300 may proceed to block 310.

At block 310, the wall thickness may be varied via forming the first transition area. The inner tool may be manipulated gradually to form the transition area. That is, the inner tool or mandrel may be wedged in relation to the outer tool to change the wall thickness. The inner tool may be increasingly manipulated to form a consistent gradient along the length of the transition area. The gradient and length of the transition area may depend on the difference between the wall thicknesses on either side of the transition area. For instance, if there is merely a slight difference between $T_x$ and $T_y$, the gradient and length of the transition area may likewise be small. On the other hand, if the difference in thickness between $T_x$ and $T_y$ is increased, the gradient and/or length of the transition area becomes larger. The transition area may extend until the support wall thickness transitions from $T_x$ to $T_y$. The process 300 then proceeds to block 315.

At block 315, the relationship between the inner tool and the outer tool is changed to form the desired wall thickness. That is, the inner tool is wedged or torqued in relation to the outer tool to decrease the wall thickness or increase the inner diameter of the support. Controlling the relationship between the inner tool and the outer tool allows for the walls of the support to be indefinitely varied such that multiple sections can be of varied thickness. The wall thicknesses $T_x$ and $T_y$ may generally be constant over lengths $L_x$ and $L_y$, respectively. The wall thickness of $T_y$ after the transition area is always greater than the wall thickness of $T_x$ before the transition area, to wit, $T_x$ is greater than $T_y$. The outer diameter of the support $D_x$ and $D_y$, on the other hand, may be generally uniform over the length L of the support. Decreasing the wall thickness over the length of the support consequently results in mass and material savings as the material (e.g., steel) is stretched over a greater length than traditional methods of metalworking.

At block 320, it is determined whether the support will continue to be manipulated for further decreased wall thicknesses. The support may be continually manipulated along its length L to indefinitely decrease the support wall thickness $T_n$ thereby forming indefinite variable wall thickness sections $L_n$. Accordingly, the support structure may be comprised of any number of sections having varied wall thickness as the inner tool is further introduced into the ingot/billet material. Upon reaching the desired number of sections having variable wall thickness, the process 300 proceeds to block 325. Otherwise, the process returns to block 310 for continued manipulation.

At block 325, it may be determined whether the support structure should be cold-worked or whether the final product does not require cold-working. If the support structure is to be cold-worked, the process 300 proceeds to block 330. Otherwise, the process 300 ends with the final product.

At block 330, the support structure may be cold-formed, for instance by introduction into a chain draw bench, causing the support structure material to undergo strain hardening. As such, the yield strength and tensile strength values of the material are increased while its elongation and toughness values decrease. After cold-working, the process ends.

Accordingly, by manipulating the inner tool and changing the relationship between the inner tool and the outer tool, support structures with variable walls may be produced indefinitely. The finished product according to the process 300 exhibits superior rigidity and less malleability. The thinner or less thick sections display increased material strength relative to comparable wall thicknesses produced by alternative methods. The uniformity of the outer diameter of the support allows multiple support structures to be combined easily via joints.

Thus, a support structural product is provided for components within a metallic structure such as a steel structure. The support structural product may include a beam comprising a hollow metal tube configured to be coupled to a structure. The product may be in the form of a tube constructed from a single piece of tubing having at least first and second portions. The first portion has a first diameter and a first thickness, the second portion has a second diameter and a second thickness. The second diameter can be the same size as the first section but the thickness of the second section will always be smaller than or equal to the thickness of the first portion. A transition area is disposed therebetween to gradually transition from the thickness of the first section to the thickness of the second section.

The resulting product has increased strength and reduced mass, thereby minimizing manufacturing costs while providing an enhanced product.

The product may be used in any structural metal assembly and be attached by mechanical or other metal joining methods while eliminating the need for such methods within the product itself.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of making a tubular support, comprising:
   drawing a metallic tube having a longitudinal axis to extend its length and selectively changing its wall thickness;
   forming a first end of the tube having a first length, a first wall thickness and a first outer diameter;
   forming a second end of the tube having a second length, a second wall thickness and a second outer diameter; and
   disposing a transition area between the first end and the second end, wherein the second wall thickness is less than the first wall thickness;
   wherein disposing the transition area between the first end and the second end includes mechanically varying the wall thickness of the tube by manipulating a mandrel positioned within the tube in a radial direction relative to the longitudinal axis to transition from the first wall thickness to the second wall thickness.

2. The method of claim 1, wherein the transition area varies generally consistently along the length of the metallic tube from the first end to the second end to transition from the first wall thickness to the second wall thickness.

3. The method of claim 1, wherein the first outer diameter is the same as the second outer diameter.

4. The method of claim 1, wherein forming the first end of the tube includes working the mandrel in an axial direction with respect to the longitudinal axis to form the first wall thickness substantially consistent along the first length.

5. The method of claim 4, wherein forming the second end of the tube includes displacing the mandrel radially with respect to the longitudinal axis to form the second wall thickness less than the first wall thickness.

6. The method of claim 1, wherein forming the second end of the tube includes torquing the mandrel radially with respect to the longitudinal axis along the second length.

7. The method of claim 6, wherein the mandrel has a diameter corresponding to an inner diameter of the first end along the first length.

8. A method of forming a tubular support, comprising
   forming a metallic tube via an outer tool and an inner tool, wherein the outer tool has an opening receiving the tube;
   inserting the inner tool concentrically into the tube to form a first section having a first length, a first wall thickness, and a first outer diameter;
   manipulating the inner tool to change the relationship of the inner tool relative to the outer tool to form a second section having a second length, a second wall thickness, and a second outer diameter;
   disposing a transition area between the first section and the second section;
   wherein the first wall thickness is greater than the second wall thickness; and
   wherein manipulating the inner tool to change the relationship of the inner tool relative to the outer tool to form the second section includes displacing the inner tool radially with respect to the opening of the outer tool to form the second wall thickness less than the first wall thickness.

9. The method of claim 8, wherein the transition area includes a gradient starting with the first wall thickness and extending to the second wall thickness, wherein a wall thickness of the transition area varies substantially consistent along a length of the transition area.

10. The method of claim 8, wherein the first length is less than the second length.

11. The method of claim 8, wherein the first outer diameter is substantially equal to the second outer diameter.

12. The method of claim 8, further comprising forming a third section by manipulating the inner tool to change the relationship of the inner tool relative to the outer tool, the third section having a third length, a third wall thickness, and a third outer diameter, wherein a second transition area is disposed between the second section and the third section.

13. The method of claim 12, wherein at least one of (i) the third wall thickness is less than the second wall thickness and (ii) the third outer diameter is substantially equal to the first outer diameter and the second outer diameter.

14. The method of claim 13, wherein the second transition area includes a gradient less than the first transition area.

15. The method of claim 8, wherein disposing the transition area between the first section and the second section includes adjusting the inner tool radially with respect to the opening of the outer tool to vary a wall thickness of the transition area.

16. The method of claim 15, wherein adjusting the inner tool includes increasingly manipulating the inner tool in a radial direction to form a gradient along the length of the transition area between the first wall thickness and the second wall thickness.

17. A method of forming a tubular support, comprising:
providing a hollow tube;
inserting an inner tool into the hollow tube;
mechanically reducing a first section of the hollow tube by moving the hollow tube through an opening of an outer tool a first length, the first section having a first wall thickness and a first outer diameter;
forming a transition area by changing a relationship between the inner tool and the outer tool via manipulating the inner tool radially with respect to the opening of the outer tool; and
mechanically reducing a second section of the hollow tube by moving the hollow tube through the opening of the outer tool a second length, the second section having a second wall thickness and a second outer diameter;
wherein the transition area is disposed between the first section and the second section, and wherein the second wall thickness is different from the first wall thickness.

18. The method of claim 17, wherein mechanically reducing the second section includes radially torquing the inner tool with respect to the opening of the outer tool to decrease the second wall thickness, and wherein the second wall thickness is less than the first wall thickness.

19. The method of claim 17, wherein mechanically reducing the first section includes radially torquing the inner tool with respect to the opening of the outer tool to form the first wall thickness.

20. The method of claim 17, wherein forming the transition area further includes increasingly manipulating the inner tool in a radial direction with respect to the opening of the outer tool to form a gradient along a length of the transition area between the first wall thickness and the second wall thickness.

* * * * *